Figure 1:
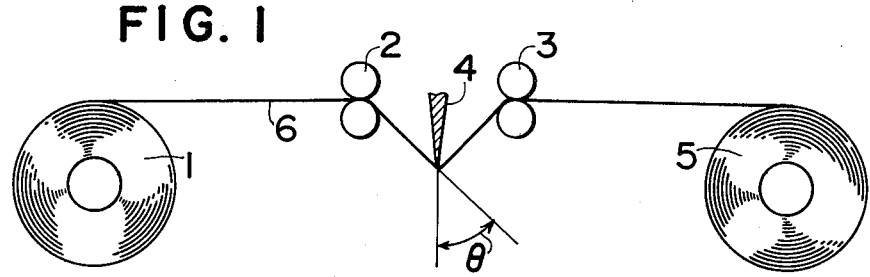

United States Patent [19]

Nakamura et al.

[11] 3,995,007

[45] Nov. 30, 1976

[54] METHOD OF STRETCHING FILM BELOW THE NATURAL DRAW RATIO WITHOUT NECKING

[75] Inventors: Kozo Nakamura; Hiroatsu Tsunoda; Tadao Kimura, all of Iwakuni, Japan

[73] Assignee: Sanyo-Kokusaku Pulp Co., Ltd., Tokyo, Japan

[22] Filed: July 24, 1974

[21] Appl. No.: 491,453

Related U.S. Application Data

[63] Continuation-in-part of Ser. No. 294,805, Oct. 4, 1972, abandoned.

[30] Foreign Application Priority Data

| Oct. 5, 1971 | Japan | 46-77541 |
| Oct. 5, 1971 | Japan | 46-77542 |
| Oct. 5, 1971 | Japan | 46-77543 |
| Oct. 5, 1971 | Japan | 46-77544 |

[52] U.S. Cl. .................. 264/288; 264/289
[51] Int. Cl.² ............................... B29D 7/24
[58] Field of Search .......... 264/292, 288, 289, 285, 264/DIG. 73, 211, 210 R; 28/1.3, 71.3

[56] References Cited

UNITED STATES PATENTS

| 3,007,204 | 11/1961 | Veiel et al. | 264/289 |
| 3,201,506 | 8/1965 | Bills | 264/289 |
| 3,231,557 | 1/1966 | Bauer | 264/288 |
| 3,345,447 | 10/1967 | Grant | 264/211 |

*Primary Examiner*—Robert F. White
*Assistant Examiner*—James B. Lowe
*Attorney, Agent, or Firm*—Fleit & Jacobson

[57] ABSTRACT

A method for producing a synthetic crystalline thermoplastic resin film suitable for stretching without necking including adding 5 to 300 parts by weight of a filler to 100 parts of a synthetic crystalline thermoplastic resin film such as polyethylene on isotactic polypropylene having a degree of crystallization of more than 60%, pressing the film against a rigid blade having a radius of curvature of 0.01 to 1.0 millimeter, bending the film around the blade using the blade as a fulcrum to a bending angle between 20° and 170°, moving the film relative to the blade while keeping the bending angle constant thereby whitening the film, said whitening of the film being conducted without positively heating or stretching the film, and stretching the film after whitening at a draw ratio below the natural draw ratio of the film.

6 Claims, 3 Drawing Figures

METHOD OF STRETCHING FILM BELOW THE NATURAL DRAW RATIO WITHOUT NECKING

CROSS-REFERENCE TO RELATED APPLICATION

This application is a continuation-in-part of application Ser. No. 294,805, filed Oct. 4, 1972, now abandoned, for METHOD FOR PRODUCING A THERMOPLASTIC POLYMER FILM by Kozo Nakamura et al.

This invention relates to a method for producing a resinous film or sheet having a crystalline thermoplastic resin as a main component. More particularly, it relates to a method for producing a stretched film or sheet having no necking by whitening the film or sheet by edge friction and then stretching the film by a known process. When a film of thermoplastic crystalline polymer is subjected to uni-or biaxial stretching at a temperature below the melting point of the polymer, a clear boundary is formed between the stretched and unstretched parts. This phenomena is called "necking," and the necking does not disappear unless the polymer film is stretched over the draw ratio called the "natural draw ratio" (the ratio of a sectional area of an unstretched part to a stretched part). Thus, a practical crystalline polymer film is either a stretched one or an unstretched one; the former is a film stretched to the natural draw ratio or above, and the latter is one not stretched at all. The properties of these polymer films are quite different. For instance, the films stretched to or above the natural draw ratio are superior to the unstretched ones in tensile strength, modulus of elasticity and the like. On the other hand, the unstretched films are superior to the stretched ones in tear strength and thermal shrinkage.

Among the thermoplastic synthetic resins, we have primarily studied the method of low draw ratio stretching of thermoplastic films comprising polyolefine resins, especially polyethylene and polypropylene having a degree of crystallization of higher than 60%, and copolymers having these polymer as the main components.

As a result, we have found that these polymers and copolymers are capable of being stretched uniformly at a draw ratio below the natural draw ratio without necking by putting a film formed by a conventional method against a rigid blade, bending the film at a definite angle and rubbing the edge of the film by immigrating the film in the longitudinal direction against the edge of the blade keeping the angle the same as the one described above in a process hereinafter called "edge friction". As a result of this edge friction treatment, the film is whitened or deformed but is not stretched. By "stretching", we mean elongation accompanied by molecular orientation and by "whitening" or "deforming" we mean elongation without molecular orientation.

As the result of detailed investigation, we have found that the effects of the edge friction are different depending on the modulus of elasticity of the film, the amount of inorganic or organic filler employed, the amount of pigment, the thickness of the film, the angle between the film and the blade, the radius of curvature of the blade, the temperature of treatment, etc. The range for each factor we have found to be useable for obtaining satisfactory results can be described as follows: the modulus of elasticity of the film at ambient temperature

| | |
|---|---|
| | $3 \times 10^9$ to $8 \times 10^{10}$ dyne/cm$^2$, |
| amount of filler | 5 to 300 parts by weight per 100 parts of polymer, |
| thickness of film | 10 to 5000 microns; |
| angle between film and edge of blade | 5° to 80°; |
| radius of curvature of blade | 0.01 to 1.0 mm; |
| temperature | near ambient temperature, i.e., without positively heating the film |

The results become better the higher the modulus of elasticity of the film, the larger the thickness of the film, the lower the temperature of treatment and the greater the amount of inorganic or organic filler, but if the above ranges are exceeded, good results are not obtained such as breaking of the sheet, etc. If no fillers are used or smaller amounts of fillers are used than mentioned above, the films cannot be stretched without necking as desired.

The smaller the angle between the film and the blade, and/or the smaller the curvature of the blade, the larger the effect becomes, but exceeding the ranges causes breaking of the sheet.

If the temperature of treatment is limited, for example to the range of 0° to 30° C, adequate results are not obtained below 5 PHR (parts by weight per 100 parts of resin) of fillers, while in exceeding 5 PHR of the fillers, the effect becomes larger as the amount of fillers increases. Necking does not occur even by stretching the film lengthwise to a draw ratio below two if the edge friction is carried out under the combination of conditions described above. After the edge friction treatment is completed, the film can be stretched uniformly even to a draw ratio below the natural draw ratio of the composition by the conventional method of uni-or biaxial stretching. The particle sizes of the fillers are particularly preferred to be from 0.01 to 50 microns. Too large particle sizes may cause scratches in the surface of the film treated by the edge friction.

The stretched materials thus obtained were found to have intermediate properties, according to the draw ratio, between a stretched material drawn to or over the natural draw ratio and a non-stretched one.

A sheet containing an amount of fillers over 300 PHR is easy to break and makes the treatment of edge friction difficult. The kinds of fillers are not particularly limited but are required to be inactive with respect to the thermoplastic synthetic crystalline resins and stable at the forming temperature.

The average particle size of the fillers is also required to be in the range of 0.01 to 100 microns and to be free from particles of size over the thickness of the film. It is not believed that small size particles influence the effects of edge friction, although experimental data on fillers below 0.01 micron average particle size are not available. Too large a particle size apparently causes unfavorable results. The use of an average particle size over 100 microns, and of particle sizes over the thickness of the film, result in scratches in the surface of the film during the edge friction process and often breaking of the film.

The particularly suitable fillers are calcium carbonate, calcium sulphate, aluminum-hydroxide, titanium dioxide, clays, diatomaceous earth, mica, asbestos, glass powders, pulp flocks, charcoal powders, fiber scraps, etc.

Figure 2:
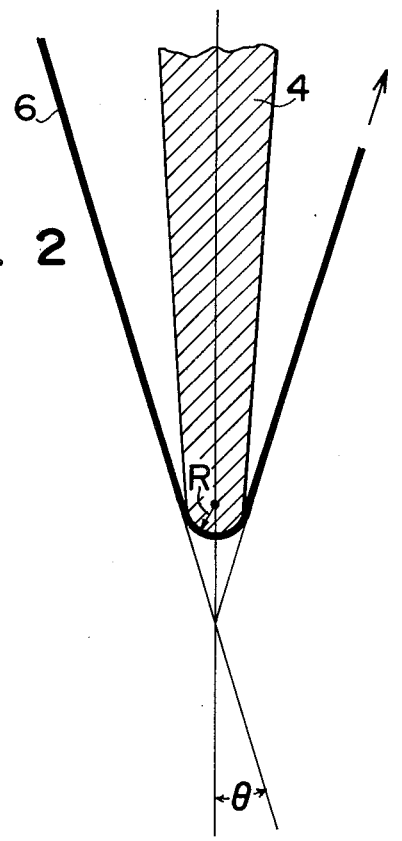
Figure 3:
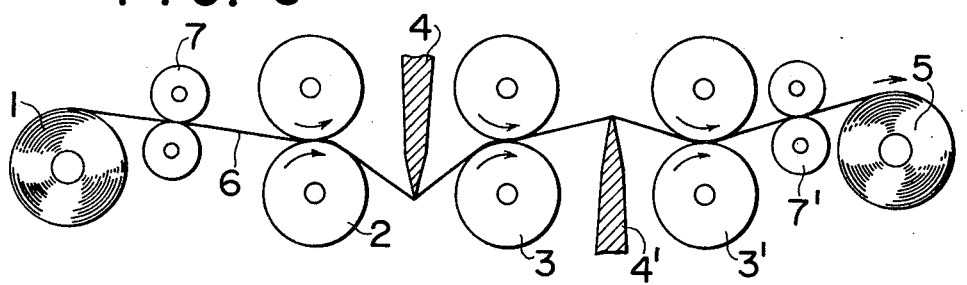

FIG. 1 is a schematic drawing representing one form of the apparatus for carrying out the method of the present invention. Film 6 is fed from feed roll 1 through nip rolls 2 and 3 and is wound on wind up roll 5 after being bent around blade 4 of FIG. 1. Blade 4 has a radius of curvature R and film 6 is wound around blade 4 at bending angle $\theta$. FIG. 2 is an enlarged view of the blade 4 shown in FIG. 1. FIG. 3 is a similar schematic to FIG. 1 except that two blades 4 and 4' are employed along with additional nip rolls 3, 7 and 7'. Generally speaking, the tension on film 6 during the "whitening" or "deformation" operation is in the range of 100 to 350 kg/cm$^2$, although it should be understood that the exact tension will depend on the materials used.

EXAMPLE 1

A film having a thickness of 1 mm, a modulus of elasticity of $1.5 \times 10^{10}$ dyne/cm$^2$ and the following composition was treated by edge friction at a film bending angle of 150° with a blade having a radius of curvature (R) of 0.2 mm at ambient temperature using the apparatus shown in FIGS. 1 and 2.

Composition

| | | |
|---|---|---|
| (1) | High density polyethylene trade name, "Hizex 7000 F", molecular weight 120,000, produced by Mitsui Petrochemical Co., Ltd. | 100 parts by weight |
| (2) | Calcium carbonate trade name, "Whiton SB", average particle size 1.8 microns, produced by Shiraishi Calcium Co., Ltd. | 5 PHR |
| (3) | Stearic acid, produced by Sakai Chemical Industry Co., Ltd. | 0.5 PHR |

The film uniformly whitened by the edge friction is then biaxially stretched to a draw ratio of two in both the longitudinal and transverse directions (area draw ratio of 4; length × 2, width × 2) at 105° C, and a uniformly stretched film having no necking is obtained. The film is then heat-treated at 115° C for 5 minutes.

Table 1 shows the tearing resistances and tensile strengths of the stretched film of Example 1. In this table, References A, B and C each had the same composition as the stretched film of Example 1. Reference A was biaxially stretched to an area draw ratio of 10 which is above the natural draw ratio without being subjected to any edge friction, Reference B was biaxially stretched to an area draw ratio of 4 which is below the natural draw ratio without being subjected to any edge friction, and Reference C was neither treated with edge friction nor stretched. In Tables 1 and 2 the "area draw ratio" refers to the product of the longitudinal and transverse draw ratios and the biaxially stretched films.

In Table 1, the tearing resistance of Reference C is higher than that of Example 1 and Reference A, and cannot be torn in the tearing direction. The tearing strength of Reference C cannot be accurately measured because the tearing line is not a straight line. As is obvious from Table 1, the stretched film of this invention has intermediate properties between the non-stretched films and the films stretched more than the natural draw ratio.

Table 1

| | Stretched film of Ex. 1 | Reference A stretched to area draw ratio of 10, without edge friction | Reference B stretched to area draw ratio of 4, without edge friction | Reference C non-stretched |
|---|---|---|---|---|
| Tearing resistance, kg/mm | 1.0 | 0.1 | Impossible to measure | Very high |
| Tensile strength, kg/mm$^2$ | 4.5 | 8.0 | Impossible to measure | 2.0 |

EXAMPLE 2

A film having a thickness of 0.3 mm, a modulus of elasticity of $8 \times 10^9$ dyne/cm$^2$ and the following composition is treated by edge friction with a blade having a radius of curvature (R) of 0.5 mm, and at a bending angle of the film of 90°, using the same apparatus as in Example 1 at ambient temperature.

Composition

| | | |
|---|---|---|
| (1) | High density polyethylene trade name, "Hizex 7000 F", molecular weight 120,000, produced by Mitsui Petrochemical Co., Ltd. | 100 parts by weight |
| (2) | Calcium carbonate trade name, "Whiton SB", average particle size 1.8 microns, produced by Shiraishi Calcium Co., Ltd. | 60 PHR |
| (3) | Stearic acid produced by Sakai Chemical Industry Co., Ltd. | 1.5 PHR |
| (4) | Non-ionic antistatic agent trade name "Electrostripper EA-3", produced by Kao Sekken Co., Ltd., | 2.0 PHR |
| (5) | Ultraviolet absorber trade name, "Tinuvin 527", | 0.1 PHR |

-continued produced by Ciba-Geigy Co., Ltd., 2-(2'-hydroxy-3',5'-ditert-butyl-phenyl) 5 chlor-benzo triazole The film uniformly whitened by edge friction is biaxially stretched to a draw ratio of two both in the longitudinal and transverse directions (area draw ratio of 4; length × 2, width × 2) at 105° C and then heat treated at 110° for 5 minutes and a uniformly stretched film without necking is obtained.

Table 2 shows the tearing resistances and tensile strengths of the stretched film of Example 2. References A, B and C each have the same composition as the film of Example 2. Reference A was stretched to an area ratio of 10 which is above the natural draw ratio without being subjected to any edge friction, Reference B was stretched to an area draw ratio of 4 which is below the natural draw ratio without being subjected to any edge friction, and Reference C was neither subjected to edge friction nor stretching.

The tearing resistance of Reference C is far higher than that of Example 2 and Reference A. The tearing strength of Reference B cannot accurately be measured. As is obvious from Table 2, the product according to this invention has, as in Example 1, intermediate properties between the non-stretched film and film stretched over the natural draw ratio of the composition.

necking when it is stretched to a draw ratio of 1.5 in the longitudinal direction and to 2.5 in the transverse direction successively.

What is claimed is:

1. A method for producing a synthetic crystalline thermoplastic resin film suitable for stretching without necking comprising adding 5 to 300 parts by weight of a filler having a particle size from 0.01 to 100 microns to 100 parts of a synthetic crystalline thermoplastics resin film selected from the group consisting of polyethylene and polypropylene each having a degree of crystallization of more than 60%, pressing said film against a rigid blade having a radius of curvature of 0.01 to 1.0 millimeter, bending said film around said blade using said blade as a fulcrum to a bending angle between 20° and 170°, moving said film relative to said blade while keeping said bending angle constant under a tension of 100 to 350 kg/cm² thereby whitening said film, said whitening of said film being conducted at near ambient temperature without positively stretching said film, and stretching said film after whitening at a temperature below the melting point of the resin and at a draw ratio below the natural draw ratio of said film without necking.

Table 2

|  | Stretched film of Ex. 2 | Reference A stretched to area draw ratio of 10, without edge friction | Reference B stretched to area draw ratio of 2.25, without edge friction | Reference C non-stretched |
| --- | --- | --- | --- | --- |
| Tearing resistance, | 0.5 kg/mm | 0.05 | Impossible to measure | Very high |
| Tensile strength, | 1.0 kg/mm² | 2.0 | Impossible to measure | 1.5 |

EXAMPLE 3

A film having a thickness of 0.8 mm, a modulus of elasticity of 2.0 × 10¹⁰ dyne/cm² and the following composition was treated by edge friction with a blade having a radius of curvature (R) of 0.4 mm, at a bending angle of the film of 90°, using the same apparatus as in Example 1 at ambient temperature.

Composition

| (1) | Isotactic polypropylene trade name, "Noblen EP-BQ", degree of crystallization 71%, melt index 0.2 – 0.3 g/10 min. produced by Mitsuitoatsu Chemicals, Inc. | 100 parts by weight |
| --- | --- | --- |
| (2) | Calcium carbonate trade name, "NS", average particle size 1.5 microns, produced by Nitto Funka Co., | 15 PHR |
| (3) | Stearic acid produced by Sakai Chemical Industry Co., Ltd. | 0.5 PHR |

The film uniformly whitened by edge friction is then biaxially stretched to a draw ratio of 1.5 in the longitudinal direction and to 2.5 in the transverse direction between a temperature of 100° C and 140° C. The film thus obtained is a uniform film having no necking. However, a film having the above mentioned composition which is not subjected to any edge friction causes 2. The method of claim 1 in which said synthetic crystalline thermoplastic resin film is isotactic polypropylene.

3. The method of claim 1 and further comprising adding a small amount of pigment to said film.

4. The method of claim 1 in which said film has a modulus of elasticity of 3 × 10⁹ to 8 × 10¹⁰ dyne/cm² and has a thickness of 30 to 5,000 microns.

5. The method of claim 1 in which said film is successively bent and moved past more than one rigid blade.

6. The method of claim 1 in which said filler is calcium carbonate, calcium sulfate, aluminum hydroxide, titanium dioxide, clay, diatomaceous earth, mica, asbestos, glass powder, pulp flock, charcoal powder, or fibrous scrap.

* * * * *